Jan. 2, 1940.  L. S. BITTNER  2,185,535
HYDRAULIC BRAKE SYSTEM
Filed July 12, 1938
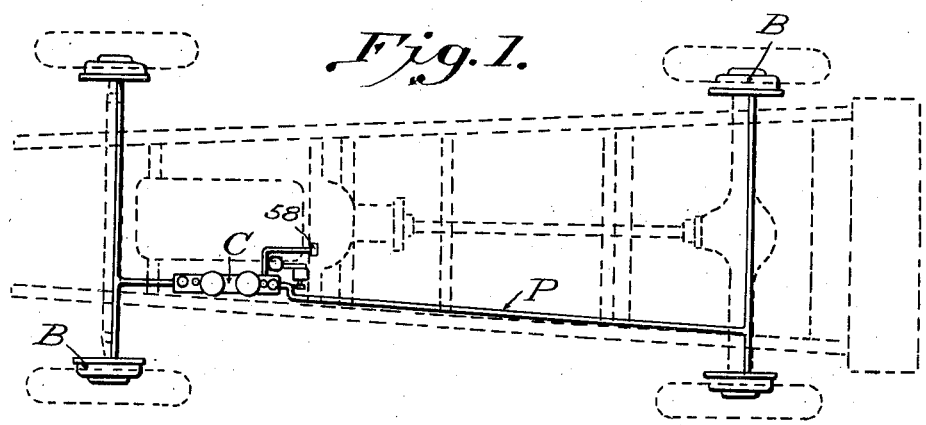
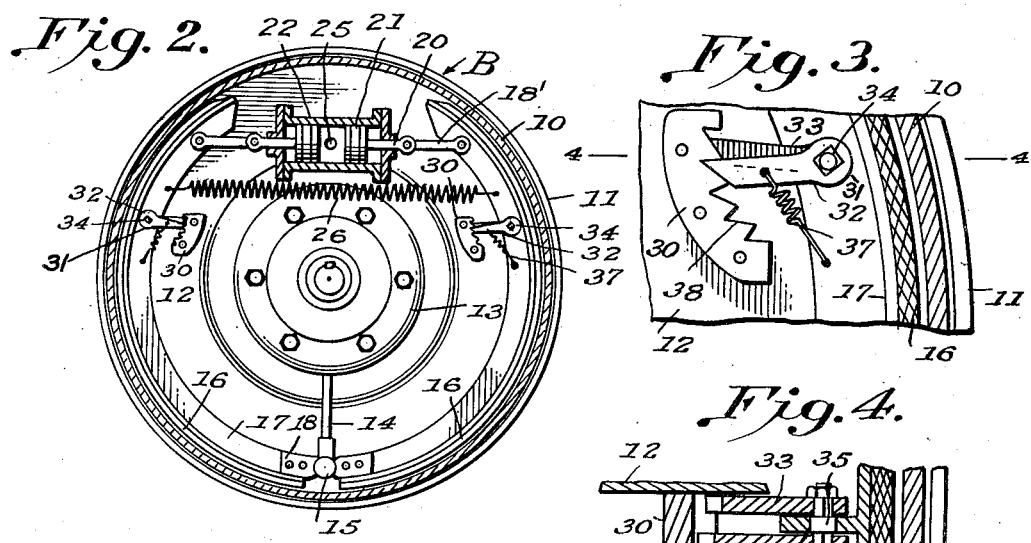
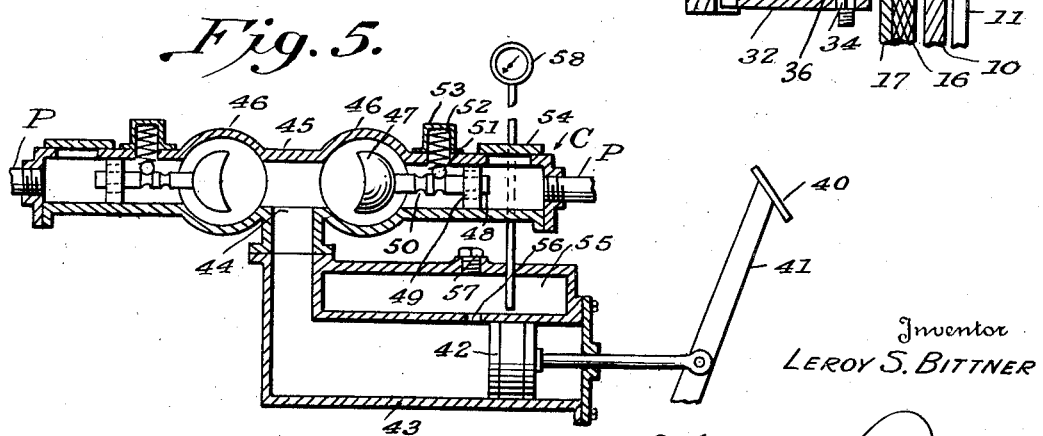
Inventor
LEROY S. BITTNER
By Francis B. Leech
Attorney Patented Jan. 2, 1940

2,185,535

UNITED STATES PATENT OFFICE 2,185,535

HYDRAULIC BRAKE SYSTEM

Leroy S. Bittner, Elysburg, Pa.

Application July 12, 1938, Serial No. 218,866

2 Claims. (Cl. 303—84)

This invention relates to a hydraulic brake system for wheeled vehicles and more particularly to an improved hydraulic brake having means for automatically compensating for the wear on the brake shoes in association with apparatus which will prevent loss of fluid from the braking system, if a fluid supply pipe is ruptured or leaking.

While automatic shoe compensators have been heretofore suggested, the structures proposed have not functioned properly and in the most instances involved constructions, which were expensive to manufacture and delicate in operation. The automatic wear compensator contemplated by the present invention is simple, rugged and absolutely reliable.

A further object of the improved hydraulic braking system is the safety cut-off device used in combination with the wear compensator which will close off a section of the hydraulic fluid conduits, if a conduit becomes ruptured or leaks to a degree sufficient to ineffectively apply the brakes.

In the drawing,

Fig. 1 is a diagrammatical showing of the hydraulic braking system as applied to a motor vehicle;

Fig. 2 is a vertical medial section of a hydraulic brake assembly embodying the present invention;

Fig. 3 is an enlarged fragmentary view of one of the automatic brake band compensating devices;

Fig. 4 is a fragmentary horizontal sectional view of the compensating device taken on line 4—4 of Fig. 3;

Fig. 5 is a vertical longitudinal section of the hydraulic pressure creating mechanism for energizing the brakes.

As illustrated in Fig. 1 the present invention pertains to a hydraulic brake mechanism for use on motor vehicles and comprises in its broad aspects a plurality of internally expanding wheel brakes B joined by suitable pressure piping P to a hydraulic pressure creating mechanism C.

Each wheel brake B consists of a brake drum carried on or formed integrally with a dust plate 11 having a central section 12 to which the circular plate 13 is bolted. Secured to the plate 13 is a downwardly extending fulcrum rod 14 that terminates in a horizontal pivot 15 to which the expending brake shoes 16 are hinged. Each shoe comprises a substantially semi-circular T cross-section metal web member 17 having a lower end 18 for embracing the pivot 15 and carrying the friction bands or shoes 16 riveted to the outer face thereto. The upper ends of the webs are spaced apart though pivotally connected to links 19', which in turn are pivoted to hydraulic piston rods 20 attached to pistons 21 carried in pressure cylinder 22, which is fastened to the dust plate 12. The pistons 21 are moved outwardly by the introduction between them through fluid port 25 of fluid pressure to force the friction bands or shoes 16 into contact with the brake drum 10. A coil spring 26 is affixed to the upper ends of the web members 17 to insure that the bands 16 will be out of engagement with the drum except when fluid pressure is exerted on the pistons.

However, it is most desirable to normally position the friction bands 16 just out of contact with the drums so that comparatively small fluid pressure and consequent outward movement of the shoes is necessary to adequately apply the brakes, and also to compensate for wear of the bands as their surfaces are worn down from use. These two important factors are solved by the use of a combined wear compensator and band adjuster which comprises an arcuate toothed segment 30 riveted or welded to the central portion 12 of the dust plate, a segment 30 being supplied for each brake shoe. As shown in detail in Fig. 3, each segment cooperates with a double dog or pawl 31, whose spaced parallel offset arms 32 and 33 are rigidly secured at slightly different angles on the squared ends of shaft 34 provided with an enlarged circular mid portion 35, which is mounted in opening 36 bored through the angle arm of the web member 17. A coil tension spring 37 is hooked in the arm 32 and the web 17 to exert a downward pull on the pawls to urge them into engagement with the teeth 38 cut on the inner arcuate face of segment 30.

The wear compensating mechanism per se is claimed in my copending application Serial Number 264,655, filed March 28, 1939.

It is highly desirable to incorporate in a hydraulic braking system using a wear compensator as above described, a fluid pressure generator and conduit system which will automatically close off a section of the conduit or piping system if the section becomes ruptured or is leaking badly with resulting loss of fluid and fluid pressure.

Following the Pascal theory that fluid pressure travels undiminished in all directions, it will be evident that, if a rupture or leak occurs in the conduit system, the fluid pressure will decrease and none of the brakes can be effectively applied. Therefore, the present invention includes means for sealing off the section or piping which is losing pressure.

Referring to Fig. 5, it will be observed that the fluid pressure generator C comprises a foot lever 40 positioned on the floor of the automobile for operation by the driver. The pedal 40 is connected by linkage 41 to the horizontally reciprocating piston 42 mounted in cylinder 43 to discharge the fluid into the conduit system P through outlet 44.

While each brake may have an individual piping system, the invention is shown with two main branches leading from the pressure generator C to the front and rear sets of brakes as units. Mounted above the outlet 44 of cylinder 43 is an elongated chamber 45 to the ends of which the unit branch pipes P are connected. The chamber 45 is enlarged on either side of the discharge opening 44 as indicated by numerals 46, the enlargements being spherical while the continuation of the chamber beyond the spherical portions 46 is tubular. A valve device comprising a hollow or half ball 47, having an outwardly extending horizontal stem 48 passing through perforated plate 49, is placed in each of the spherical enlargements 46 so that under certain conditions the valve and stem may move or float outwardly to seal the outer tubular portions of the chamber 45. To insure that under ordinary operating conditions the ball valves 47 will be maintained in their open position, notches 50 are formed in the valve stem for engagement with a spring pressed ball 51, which is urged downwardly by coil spring 52 secured in casing 53.

In Fig. 5 the valves 47 are in open position so that when the foot pedal 40 is applied the piston 42 will compress the hydraulic fluid in the system to expand the brake shoes 17 through the medium of the pistons 21 contained in brake cylinders 52. The open valves 47 permit free flow of fluid into both branches of the conduit system, and it is only when a rupture or leakage occurs in one branch that the rush of fluid passing around the valves 47 will force one of the valves 47 on its stem 48 outwardly to seal the ruptured pipe unit. The second notch 50 nearest to the valve will then be engaged by the ball 51 to positively hold the valve in sealed position.

After the piping system has been repaired and it is desired to reopen the ball valve, it is a comparatively simple matter to remove one of the plates 54 and press the valve stem 48 backwardly until the ball 51 snaps into the other notch 50.

A fluid reserve reservoir 55 is integrally formed with or mounted directly above compression cylinder 43 with an opening 56 therebetween, so that the system per se is maintained full of fluid at all times. Filler cap 57 is provided for adding additional fluid into the reservoir 55. To warn the driver of the vehicle when a leak has occurred in the system and pressure has dropped or when the reservoir needs replenishing with additional fluid, a suitable gauge 58 is placed on the vehicle dash board and communicates with the reservoir 55.

It will be appreciated by those skilled in the art that the automatic brake shoe compensating means, as above described, insures that the outward expanding movement of the brake shoes is substantially the same under all conditions. That is, by taking up the wear as it occurs in small amounts the movement of the pistons and brake shoes remain substantially the same and, therefore, the foot operated compression piston in the fluid reservoir also moves substantially the same under all conditions.

If, however, a leak or rupture occurs in any portion of the conduit system, the fluid in the system either under its own internal pressure or by influence of the compression piston will rush by the ball valves and move them outwardly to seal off the conduit, which is losing compression, and effectively seal the same so that the conduits uneffected will operate as before.

What I claim is:

1. In a hydraulic brake apparatus, a cylinder, a piston adapted to move therein, a fluid reservoir secured to and in communication with said cylinder and adapted to maintain said apparatus full of fluid, an outlet passage for said cylinder, a dual valve housing secured thereto, said housing comprising similar outwardly extending chambers, a common inlet to said housing arranged intermediate the said chambers, each of said chambers having an enlarged globular portion intermediate its length, a vertical perforated plate mounted in the elongated section, a valve having a stem extending through the perforated plate, said valve being normally positioned adjacent the center of the said globular portion, and a fluid conduit extending to a brake actuator from the outer end of said chamber, the said valve being adapted to seat against spherical wall of the said globular portion when the valve is subjected to an abnormal flow of fluid passing through said chamber.

2. In a hydraulic brake apparatus, a fluid pressure cylinder having a piston movable therein, an integral reserve fluid reservoir formed above and in communication with said cylinder, a fluid outlet for said cylinder, a dual valve chamber secured intermediate its ends and communicating with said fluid outlet, fluid conduits leading from the ends of said chamber to brake actuating mechanisms, the said valve chamber having spaced apart enlarged globular portions formed therein, individual semi-cylindrical valves mounted in each globular portion, the stems of said valves extending into the outer portions of said dual chamber and through perforated plates mounted in said outer portions for supporting the ends of the valve stems and spring pressed balls cooperating with grooves in said stems for holding said individual valves in open or closed position.

LEROY S. BITTNER.